3,409,400

BINARY, TERNARY AND QUATERNARY COMPOUNDS COMPOSED OF SILICON, NICKEL, ARSENIC, AND PHOSPHORUS

Tom Allen Bither, Jr., and Paul C. Donohue, Wilmington, Del., assignors to E. I. du Pont de Nemours and Company, Wilmington, Del., a corporation of Delaware No Drawing. Filed Mar. 10, 1967, Ser. No. 622,082
11 Claims. (Cl. 23—204)

ABSTRACT OF THE DISCLOSURE

Binary, ternary and quaternary compositions having the pyrite crystal structure of the formula $$Si_{1-x}Ni_xP_yAs_z$$

where $x$ is 0–1.0, $y$ and $z$ are 0–2.15 and the sum of $y$ and $z$ is 1.85–2.15 are claimed. These compositions are produced from mixtures of elemental As, Ni, P and/or Si at temperatures of 700–1300° C. at pressures up to 70 kilobars (kb.). $SiP_2$ and $Si_{1-x}Ni_xP_2$ also are produced from mixtures of elemental Ni, P and/or Si at autogenous pressures. The products are useful as components of electrical switches and devices.

BACKGROUND OF THE INVENTION

A. Field of the invention.—This invention relates to binary, ternary and quaternary compositions composed of silicon and/or nickel with phosphorus and/or arsenic and to the process for their preparation.

B. Description of the prior art.—Compounds having the composition $NiP_2$, $NiAs_2$ and $SiAs_2$ have been reported but these compounds lack the cubic pyrite crystal structure of the compounds of this invention.

$NiP_2$ having a monoclinic crystalline structure was reported to be produced by direct combination of the elements in a sealed quartz tube at a temperature of about 800° C. at autogenous pressure. E. Larson, Arkiv, for Kemi., 23, 335 (1964). A similar preparation at temperatures of 800–1100° C. produced monoclinic $NiP_2$ probably having the space group $C_2/c$. or cc. S. Rundquist, Acta Chem. Scand., 15, 451 (1961), Chem. Abst. 56: 5477*a*.

Two crystallographic forms of $NiAs_2$ which also exist as the naturally occurring rammelsbergite and pararammelsbergite have been produced by R. D. Heyding and L. D. Calvert, Can. J. Chem., 38, 313 (1960), by heating a mixture of the elements at about 900° C. with no external pressure required. $NiAs_2$ having a pyrite-type crystal structure has not been reported.

$SiAs_2$ having a complex crystal structure was reported to exist in the Si-As system at atmospheric pressure. W. Klem and P. Pircher, Z. Anorg. Chem., 247, 211 (1941).

SUMMARY OF THE INVENTION

This invention is directed to compounds having the pyrite-type crystal structure of the formula $$Si_{1-x}Ni_xP_yAs_z$$

wherein $x$ is 0–1.0, $y$ and $z$ are 0–2.15 and the sum of $y$ and $z$ is 1.85–2.15. These compounds can be prepared by heating mixtures containing silicon and/or nickel with phosphorus and/or arsenic or binary or ternary compounds of these elements at temperatures of 700–1300° C. at pressures up to 70 kb. $SiP_2$ and $Si_{1-x}Ni_xP_2$ are produced at relatively low pressures (0.005 to a few kb.) and temperatures above 700° C. particularly when the reaction mixture contains halogen. The componds of this invention are useful as conductors of electricity and as components of electrical conductors such as electrically conducting paints and as contact points for electric switches.

DESCRIPTION OF THE PREFERRED EMBODIMENTS

The binary compounds of this invention include silicon diphosphide, silicon diarsenide, nickel diphosphide and nickel diarsenide. The ternary compounds of this invention include silicon arsenide-phosphide and nickel arsenide-phosphide where the sum of the moles of arsenic and phosphorus is 1.85–2.15 per mole of silicon or nickel present. Ternary compositions composed of diphosphides and diarsenides of mixtures of nickel and silicon are included within the scope of this invention. In the latter class of compounds, the moles of phosphorus or arsenic present is 1.85–2.15 per mole of the sum of the moles of nickel and silicon present. This invention is also directed to quaternary compounds of nickel-silicon phosphide-arsenide where the mole ratio of the sum of the moles of phosphorus and arsenic is 1.85–2.15 times the sum of the moles of nickel and silicon present.

The compounds of this invention are nominally diarsenide and diphosphide and di(arsenide-phosphide) wherein the sum of the moles of arsenic and phosphorus is 1.85–2.15 per mole of silicon or nickel or mixture of silicon and nickel present. Deviation from exact stoichiometry can occur in the compounds of this invention, i.e., the mole ratio of arsenic or phosphorus, or the sum of a mixture of arsenic and phosphorus can vary from 1.85–2.15 per mole of nickel, silicon or per mole of the sum of the moles of nickel and silicon present. Preferably $SiP_2$ is less nonstoichiometric with $y=1.95$–$2.05$. Nonstoichiometric compounds are well known, see, e.g., Wadsley's chapter in Mandelcorn, Nonstoichiometric Compounds, Academic Press, New York, 1964, pp. 98–209.

The compounds of this invention are of the pyrite-type crystal structure which has the symmetry Pa3 and contains four molecules of $AB_2$ per unit cell (for pyrite, $FeS_2$, the length of the cell edge is about 5.41 A.). The crystal structure is designated as structure type C–2 in the Strukturbericht of the Zeitschrift fur Kristallographie.

The products of this invention are produced at high pressures such as up to 70 kilobars (kb.) (1 bar=$10^6$ dyne/cm.$^2$) at temperatures of about 500–1500° C. Silicon diphosphide and $Si_{1-x}Ni_xP_2$ ternaries also can be produced at lower pressures such as 0.005–30 kb. particularly when the reaction mixture contains a small amount of halogen, such as chlorine, bromine or iodine used as a catalyst or promotor. The preferred pressure for the halogen catalyzed reactions is 0.01–0.1 kb. at a temperature of about 700–1300° C. The preferred pressure for preparing silicon diarsenide is 55–65 kb. at a preferred temperature of about 1100–1300° C. $Si_{1-x}Ni_xAs_2$ and $NiP_yAs_z$ are preferably prepared at pressures of 30–65 kb. and temperatures of 900–1300° C. The other compounds of this invention are preferably prepared at temperatures of 800° C. to 1300° C. and pressures of 30–65 kb.

The process of this invention comprises subjecting mixtures of elemental nickel, and/or silicon, with phosphorus and/or arsenic, binary or ternary combination of the elements, such as the nonpyrite $SiAs_2$ or $NiP_2$ or a mixture of SiP and P, at pressures up to 70 kb. at temperatures of 500–1500° C. Preferably, the mixture is thoroughly ground. The majority of the reaction mixture preferably has a particle size of 100 microns or less although mixtures containing larger particles can be used.

The process for the preparation of $SiP_2$ or $Si_{1-x}Ni_xP_2$ does not require extremely high pressures to produce useful yields. The presence of chlorine, bromine or iodine usually increases the rate of reaction. The halogens are preferably present at 0.05–1.0 weight percent of the combined weight of the other reactants.

It is preferable to use a reaction mixture containing excess of the lower melting reactant, which is generally phosphorus or arsenic. It is believed that the excess reactant in the molten state acts as a flux for the higher melting components and products. Other substances can be used as fluxes, for example, elemental lead serves as a flux (Example 5). The ratio of the elements of the quaternary product of this invention is dependent upon the initial composition of elements in the reaction mixture and also to some degree upon the reaction condition used, i.e., pressure and temperature.

The process for producing products, i.e., $SiP_2$ and $Si_{1-x}Ni_xP_2$, at pressures of 3 kb. and less can be conducted in pressure bombs. In some of the examples below, pressure bombs, internally heated by a platinum resistance furnace were used. The process at pressures of 3 kb. and less can be conducted by sealing the reactants in an evacuated heavy-walled (2 mm.) Pyrex® tube. The sealed Pyrex® glass tube is placed in the pressure bomb. At temperatures above 700° C., Pyrex® becomes soft. Under pressure at these high temperatures the softened glass collapses and subjects the reactants to the pressure within the bomb. The glass tube is an essentially inert reaction container for the reactants. Pressures of 3–30 kb. are also obtainable from presently available fabricated high pressure equipment. The latter pressures are particularly useful for producing the compounds having high nickel content, i.e., $x=0.5$ or higher.

The high pressures, i.e., 30–70 kb., used for this process can be obtained by using a tetrahedral anvil pressure device as described by E. C. Lloyd, et al., Journal of Res., Nat. Bureau of Standards, 63C, 59 (1959). In this device, the reactants are placed in a boron nitride container which fits in a graphite sleeve that serves as a resistance heater. This assembly is inclosed in a pyrophyllite tetrahedron and placed in the anvil device. Pressures in excess of 65 kb. are possible in a tetrahedral anvil device, which has been demonstrated to levels in excess of 90 kb.

Other devices for developing extreme pressure can also be used, such as a cascade machine providing two stages of pressure, with the lower pressure primary stage serving to support the smaller, higher-pressure vessel. Two-stage devices were employed by P. W. Bridgman [Phys. Rev. 57, 342 (1940) and Proc. Am. Acad. Arts Sci., 74, 425) 1942], and more recently have been described by F. R. Boyd in "Modern Very High Pressure Techniques," Wentorf, editor, Butterworth and Co., Ltd., London, p. 154 (1962).

In one embodiment of a two-stage device, the pressure in the inner cylindrical vessel is developed by the opposed motion of two carbide pistons. The inner vessel itself is supported radially through a tapered press fit of controlled interference into the cylindrical vessel of the primary stage. Support of both ends of the inner stage is achieved through pressure development in plastic polytetrafluoroethylene employed in the primary stage. Force and motion of the two pistons of the primary stage serve to develop simultaneously the support pressure and the ultimate high pressure in the inner vessel.

The pressure medium of the inner stage is made of the soft plastic mineral pyrophyllite. Centrally located in the pyrophyllite is a cylindrical graphite sleeve which serves as a resistance heater around the boron nitride container. Electrical contacts with the graphite heater are made through the inner pistons which, in turn, are in contact with the pistons of the primary stage vessel. Suitable electrical insulation is provided for one pair of inner and primary pistons.

For a primary stage of fixed diameter, the pressure developed in the polytetrafluoroethylene and the pressure developed in the inner stage are related to the relative lengths and relative compressibilities. As usually controlled, the relative motion of the primary pistons and the force applied to them is correlated with the electrical transitions accompanying recognized phase transitions. In the tetrahedral anvil device, direct correlation of force with electrical transition is possible.

Four of the calibration points used to determine pressure developed in these devices appear in the 1963 edition of the American Institute of Physics Handbook, part 4, page 43, as follows. All values are for ambient temperature.

Bismuth I→II 25.37±0.02 kb.
Bismuth II→III 26.96±0.18 kb.
Thallium II→III 36.69±0.11 kb.
Barium II→III 59.0±1.0 kb.

The additional transformation point of Bi VI→VIII was considered to be 89±3 kb. ("High Pressure Measurement," Giardini-Lloyd, editors, Butterworth and Co., Ltd., London, page 1 (1963) reporting work by Montgomery, Stromberg, G. H. Jura and G. Jura on calibration studies.)

All compressions in the following examples were made on the cold assembly, and the charges then heated to the desired temperatures. With the anvil device, the appropriate thermocouple was used. No pressure correction for thermocouple behavior has been introduced, standard E.M.F. tables for 1 atm. being employed. In the cascade device, the temperature obtained was established from a calibration curve of power input vs. temperature determined by observing the melting of nickel and the $\alpha \rightleftharpoons \gamma$ transition in iron in similar assemblies. The melting points of nickel are reported to 60 kb. by Strong "Modern Very High Pressure Techniques," Butterworth and Co., Ltd., London (1962), p. 115, and were extrapolated to 89 kb. The reference temperature for the $\alpha \rightleftharpoons \gamma$ transition of iron are reported by Claussen, "High Pressure Measurement," Butterworth and Co., Ltd., London (1963), p. 133. The pressure unit is a bar, equivalent to $10^6$ dynes/cm.$^2$. The larger unit, a kilobar, equal to 1000 bars, is used herein.

The product obtained from the above-described high pressure processes is generally in the form of a pellet or rod. The process at autogenous pressures generally produces crystals. When rods or pellets are produced, the product generally crystallizes at the ends of the rods or pellets due to the thermal gradient which exists from the center to the end of the tetrahedral anvil. This crystallization effect especially occurs when excess reactant is used as a flux. The product can be easily separated and isolated by mechanically cutting off the ends of the rods or pellets.

The reaction product is sometimes obtained in an impure form containing unreacted starting materials. Excess arsenic or phosphorus can be removed from the product by sublimation under vacuum at a temperature below the decomposition temperature of the product. Separation of the product from impurities can sometimes be conducted in an ultrasonic water bath.

The pyrite-type compounds in general are crystalline, electrically conducting solids. The differential thermal analysis of $SiP_2$ indicates decomposition at 960° C. in air.

The products are characterized by various methods including analysis of the X-ray diffraction pattern, density and quantitative analysis. The composition of the ternary and quaternary products can be determined by application of Vegard's law (L. Vegard, Z. Phys., 5, 17 (1921); Z. Krist., 67, 239 (1928)—see also H. Bennett "Concise Chemical and Technical Dictionary," Chemical Publishing Co., 1962, i.e., "when two similar crystalline materials form a solid solution, the lattice constant of this solution devides the space between their respective lattice constants in ratio to their relative quantities.").

The density of the nickel diphosphide of Example 9 was 4.72 g./cm.$^3$ which corresponds to either of the nonstoichiometric compounds $NiP_{1.85}$ or $NiP_{2.17}$. This deviation from stoichiometry can occur for all the compounds of this invention. The phosphorus analysis of the product of Example 24 showed that the $SiP_2$ produced as a film in a vapor transport type preparation is very nearly stoichiometric.

The following examples further illustrate the invention. The intensity of the X-ray diffraction pattern is based on a value of 100 for the strongest line. The values designated as *hkl* are Millar planar spacing indices. When quenching was used, the temperature of the product was reduced from operating temperature to room temperature in less than one minute. The operating pressure was maintained during quenching. Unless otherwise stated, reactants in the form of cold-pressed pellets were prepared from mixtures of the elements described in the examples; portions of said mixtures were used to form the pellets.

Example 1.—Silicon diphosphide

A 0.3002 g. pellet was pressed from a mixture of silicon and phosphorus mixed in the mole ratio of 1 silicon to 3 phosphorus. The pellet was heated at a temperature of 1300° C. and at a pressure of 65 kb. for 2 hr., then heated for 3 hr. while the temperature was dropped to 1150° C. and quenched.

The large black single crystals formed at the ends of the pellet had the following pyrite-type X-ray diffraction pattern (Table 1). The unit cell was $a=5.704$ A. The center of the pellet was composed primarily of phosphorus. A density determination on the black crystals was in agreement for the formula $SiP_2$: Found 3.24 g./cm.$^3$; calculated 3.22 g./cm.$^3$.

TABLE 1.—X-RAY DIFFRACTION PATTERN OF PYRITE-TYPE SILICON DIPHOSPHIDE

| Intensity | Spacing A | *hkl* |
|---|---|---|
| 90 | 2.855 | 200 |
| 100 | 2.553 | 210 |
| 100 | 2.329 | 211 |
| 65 | 2.017 | 220 |
| 10 | 1.901 | 221 |
| 100 | 1.720 | 311 |
| 25 | 1.647 | 222 |
| 80 | 1.582 | 230 |
| 90 | 1.524 | 321 |
| 5 | 1.426 | 400 |
| 5 | 1.383 | 410,322 |
| 5 | 1.345 | 411 |
| 10 | 1.308 | 331 |
| 10 | 1.276 | 420 |
| 30 | 1.245 | 421 |
| 15 | 1.216 | 332 |
| 15 | 1.164 | 422 |
| 5 | 1.140 | 430 |
| 5 | 1.119 | 431 |
| 70 | 1.098 | 511,333 |
| 40 | 1.059 | 250,432 |
| 20 | 1.041 | 521 |
| 40 | 1.008 | 440 |
| 5 | .993 | 522,441 |
| 25 | .950 | 600,442 |
| 5 | .937 | 610 |
| 35 | .925 | 611,532 |
| 5 | .901 | 620 |
| 10 | .891 | 621,450,443 |
| 5 | .878 | 541 |
| 20 | .870 | 533 |
| 10 | .859 | 622 |
| 15 | .850 | 30,542 |
| 25 | .841 | 630 |
| 5 | .823 | 444 |
| 20 | .815 | 632 |
| 5 | .807 | 543 |
| 10 | .799 | 711,551 |
| 50 | .791 | 640 |
| 50 | .783 | 270,641 |
| 50 | .776 | 721,633,552 |

A least squares refinement of the X-ray powder intensity data proved the structure to a pyrite-type. The R factor defined as $$R=\frac{\sum|F^2 \text{ observed}-F^2 \text{ calculated}|}{\sum|F^2 \text{ observed}|}$$

where F is the structure factor, was reduced to 6.7%.

A four-probe resistivity measurement made on a single crystal specimen showed metallic behavior:

$$\rho_{4.2^\circ \text{ K.}}=1.7\times10^{-5}$$

ohm-cm.; $\rho_{25^\circ \text{ C.}}=7\times10^{-5}$ ohm-cm. The Seebeck coefficient is $+26$ $\mu$v./° C. Differential thermal analysis and high temperature diffractometry both indicate that $SiP_2$ decomposes at 960° C. in air.

Example 2.—Silicon diphosphide

A 0.277 g. pellet made from a mixture of 0.300 g. of silicon and 0.445 g. of phosphorus was heated at a temperature of 1400° C. and pressure of 65 kb. for 1 hr. and quenched. The product was primarily a black shiny crystalline solid which was idetnified by its X-ray diffraction pattern, subtracting X-ray diffraction lines for excess silicon, as silicon diphosphide having a cubic pyrite-type structure. The unit cell of the pyrite-type silicon diphosphide was $a=5.704$A.

Example 3.—Silicon diphosphide

A 0.285 g. pellet made from a mixture of 0.2808 g. of silicon and 0.6504 g. of phosphorus was heated at a temperature of 1400° C. and a pressure of 65 kb. for 1 hr. It was slow cooled for 4 hr. to a temperature of 1000° C. and quenched while maintaining the pressure. X-ray powder diffraction showed the product to be silicon diphosphide having the pyrite-type crystal structure. The X-ray diffraction pattern of the product showed the presence of a small amount of unreacted silicon and phosphorus.

Example 4.—Silicon diphosphide

Approximately 0.500 g. of the reactant mixture described in Example 2 was sealed in an evacuated heavy-walled Pyrex® tube, heated at a temperature of 1000° C. and at a pressure of 3 kb. for 2 hr., slow cooled to a temperature of 900° C. and then quenched. The product was a mixture of black and red crystalline solids. X-ray diffraction showed the product consisted primarily of pyrite-type silicon diphosphide containing some $SiO_2$, Si, and P impurities.

Example 5.—Silicon diphosphide

A pellet weighing 0.3565 g. was pressed from a mixture of 0.6035 g. of lead, 0.1404 g. of silicon, and 0.7000 g. of phosphorus, was heated at a temperature of 1200° C. and 65 kb. for 15 min., then slow cooled for 1 hr. to a temperature of 1000° C. and quenched.

The resulting rod-shaped pellet was composed of two regions: a black single crystalline region on the ends and a black-gray region in the center. The product on the ends of the pellet was shown by X-ray powder diffraction to be silicon diphosphide having the pyrite crystal structure. Chemical analysis of the end region gave a mole ratio of P/Si=2.00.

Example 6.—Silicon diphosphide

In a heavy-walled (2 mm.) silica tube, 0.2808 g. of silicon, 0.77 g. of phosphorus, and approximately 0.01 g. of iodine were sealed under vacuum. The tube was heated for 5 days in a temperature gradient tube furnace. The hot end of the tube was heated at a temperature of 1200° C. while the cool end of the tube had a temperature of 550° C. At a region where the temperature was about 700° C. along the tube, were deposited large (~1 mm.) black shiny crystals of silicon diphosphide having a pyrite-type structure as shown by X-ray diffraction. Excess phosphorus and SiP were also deposited in the tube.

The same product was obtained when the general procedure was repeated except that bromine was used in place of iodine.

Example 7.—Silicon diarsenide

A 0.5186 g. pellet was pressed from a mixture of 0.1404 g. of silicon and 1.1238 g. of arsenic. The pellet was heated at a temperature of 1300° C. and at a pressure of 65 kb. for 1 hr., cooled for 4 hr. to a temperature of 1100° C., then quenched. Large black single crystals of silicon diarsenide having the pyrite-type crystal structure were found in the product. The X-ray powder diffraction pattern is listed in Table 2. The unit cell was $a=6.023$A.

A least squares refinement of the X-ray powder intensities proved that the material has the pyrite-type structure. The R factor, defined as in Example 1, based on $F^2$, was reduced to 11.4%. A density determination indicated a deviation from integral stoichiometry: Found 5.52 g./cm.$^3$; calculated for $SiAs_2$: 5.41 g./cm.$^3$. The density of 5.52 g./cm.$^3$ corresponds to a product having a formula $SiAs_{2.05}$.

TABLE 2.—X-RAY DIFFRACTION PATTERN OF PYRITE-TYPE SILICON DIARSENIDE

| Intensity | Spacing A | *hkl* |
|---|---|---|
| 30 | 3.482 | 111 |
| 30 | 3.088 | 200 |
| 85 | 2.696 | 210 |
| 100 | 2.459 | 211 |
| 10 | 2.130 | 220 |
| 5 | 2.012 | 221 |
| 65 | 1.817 | 311 |
| 5 | 1.742 | 222 |
| 65 | 1.671 | 230 |
| 70 | 1.611 | 321 |
| 20 | 1.506 | 400 |
| 5 | 1.462 | 410, 322 |
| 5 | 1.420 | 411 |
| 35 | 1.314 | 124 |
| 15 | 1.284 | 332 |
| 5 | 1.230 | 422 |
| 5 | 1.205 | 430 |
| 20 | 1.159 | 511, 333 |
| 25 | 1.118 | 250, 432 |
| 15 | 1.099 | 521 |
| 20 | 1.065 | 440 |
| 5 | 1.019 | 531 |
| 5 | 1.004 | 600, 442 |
| 5 | .990 | 610 |
| 20 | .977 | 611, 532 |
| 5 | .940 | 621, 540, 443 |
| 5 | .919 | 533 |
| 10 | .898 | 630, 542 |
| 10 | .888 | 631 |
| 5 | .869 | 444 |
| 5 | .860 | 632 |
| 5 | .843 | 711, 551 |
| 10 | .835 | 640 |
| 20 | .827 | 270, 641 |
| 20 | .820 | 721, 633, 552 |
| 5 | .805 | 642 |
| 10 | .784 | 731, 553 |

Four-probe resistivity measurements made on a single crystal specimen show metallic behavior: $\rho_{4.2^\circ K.}=3\times10^{-5}$ ohm-cm., $\rho_{25^\circ C.}=1.4\times10^{-4}$ ohm-cm.

Example 8.—Silicon diarsenide

A pellet weighing 0.506 g. was pressed from a mixture of 0.2800 g. of silicon and 1.500 g. of arsenic and heated at a temperature of 1200° C. and at a pressure of 65 kb. for 2 hr. It was slow cooled for 2 hr. to a temperature of 1100° C. and then quenched. The product was a gray-black crystalline solid which was shown by its X-ray powder diffraction pattern indexed on the basis of a unit cell $a$=6.023A. To be silicon diarsenide having a cubic pyrite-type structure. The pattern also contained other unidentified lines.

Example 9.—Nickel diphosphide

A 0.4037 g. pellet of a mixture of nickel and phosphorus powders in the mole ratio of 1 nickel to 2.5 phosphorus was heated at a temperature of 1200° C. and at a pressure of 65 kb. for 2 hr., cooled for 2 hr. to a temperature of 1100° C. and then quenched. Large, black, shiny crystals of nickel diphosphide were found in the product. The X-ray powder diffraction pattern of these crystals was indexed on the basis of a pyrite-type structure of unit cell $a$=5.464 A. (Table 3). The density determination indicated a deviation from integral stoichiometry: Found 4.72 g./cm.$^3$; calculated for $NiP_2$: 4.91 g./cm.$^3$ the measured density of 4.72 g./cm.$^3$ corresponds to a product having a formula $NiP_{1.86}$.

TABLE 3.—X-RAY DIFFRACTION PATTERN OF PYRITE-TYPE NICKEL DIPHOSPHIDE

| Intensity | Spacing A | *hkl* |
|---|---|---|
| 55 | 3.158 | 111 |
| 100 | 2.734 | 200 |
| 80 | 2.447 | 210 |
| 70 | 2.233 | 211 |
| 65 | 1.934 | 220 |
| 90 | 1.649 | 311 |
| 30 | 1.578 | 222 |
| 30 | 1.517 | 230 |
| 40 | 1.462 | 321 |
| 15 | 1.258 | 331 |
| 15 | 1.224 | 420 |
| 15 | 1.194 | 421 |
| 15 | 1.166 | 332 |
| 20 | 1.116 | 422 |
| 35 | 1.052 | 511, 333 |
| 15 | 1.016 | 250, 432 |
| 10 | .999 | 521 |
| 25 | .967 | 440 |
| 10 | .912 | 600, 442 |
| 15 | .887 | 611, 532 |
| 15 | .865 | 260 |
| 15 | .834 | 533 |
| 10 | .825 | 622 |
| 10 | .816 | 630, 542 |
| 10 | .807 | 631 |

A refinement of the X-ray powder intensity data proved that the structure is a pyrite type. Spectroscopic determination showed that only Ni and P were present.

A four-probe resistivity measurement made on a single crystal specimen showed metallic behavior, nearly independent of temperature: $\rho_{4.2^\circ K.}=1.64\times10^{-3}$ ohm-cm.; $\rho_{25^\circ C.}=1.69\times10^{-3}$ ohm-cm. The Seebeck coefficient of the product is $-44.2$ $\mu$v./° C.

Example 10.—Nickel diphosphide

A pellet weighing 0.4238 g. was made from a mixture of 0.2935 g. of nickel and 0.465 g. of phosphorus. The pellet was heated at a temperature of 1100° C. and at a pressure of 30 kb. for 1 hr., cooled for 2 hr. to 900° C., and quenched. The product was a black-gray material containing pyrite-type nickel diphosphide, as shown by its diffraction pattern. X-ray diffraction lines corresponding to $PtP_2$ were also present, indicating contamination by the Pt rings used in the tetrahedral anvil high pressure apparatus.

Example 11.—Nickel diarsenide

A pellet weighing 0.6949 g. made from a mixture of 0.294 g. of nickel and 0.749 g. of arsenic. It was heated at a temperature of 1200° C. and at a pressure of 65 kb. for 1 hr. The pellet was cooled for 4 hr. to a temperature of 400° C. and quenched. The product was a bright, shiny, silvery material containing pyrite-type nickel diarsenide having a unit cell $a$=5.762 A. as the major component. Starting materials and other components were present in minor amount.

A four-probe resistivity measurement on a section of the product gave a value: $\rho_{25^\circ C.}=3.02\times10^{-4}$ ohm-cm. The resistivity was essentially temperature independent to liquid helium temperatures.

Example 12.—Nickel diarsenide

A pellet weighing 0.6451 g. made from a mixture of 0.2935 g. of nickel and 1.123 g. of arsenic was heated at a temperature of 1300° C. and a pressure of 65 kb. for 1 hr. It was cooled for 4 hr. to 1100° C. and quenched. The pellet was divided into end and center regions. The end regions were composed primarily of pyrite-type nickel diarsenide along with another component. The X-ray diffraction pattern (see Table 4) of the pyrite-type nickel diarsenide was indexed on the basis of a unit cell of $a$=5.788 A. The difference in unit cell size from that of the product of Example 11 indicates a slight difference in stoichiometry.

TABLE 4.—X-RAY DIFFRACTION PATTERN OF PYRITE-TYPE NICKEL ARSENIDE

| Intensity | Spacing A | hkl |
|---|---|---|
| 40 | 2.890 | 200 |
| 100 | 2.584 | 210 |
| 90 | 2.359 | 211 |
| 20 | 2.043 | 220 |
| 60 | 1.742 | 311 |
| 10 | 1.668 | 222 |
| 60 | 1.603 | 320 |
| 25 | 1.545 | 321 |
| 5 | 1.444 | 400 |
| 5 | 1.292 | 420 |
| 10 | 1.262 | 421 |
| 10 | 1.232 | 332 |
| 2 | 1.181 | 422 |
| 5 | 1.113 | 511,333 |
| 5 | 1.074 | 250,432 |
| 5 | 1.056 | 521 |
| 5 | 1.023 | 440 |
| 5 | .939 | 611,532 |

Example 13.—Nickel diarsenide

A pellet weighing 0.6269 g. made from a mixture of 0.2935 g. of nickel and 1.033 g. of arsenic was heated at a temperature of 1100° C. and at a pressure of 30 kb., slow cooled 2 hr. to 900° C., and quenched. The X-ray diffraction pattern showed that the product was the pyrite-type nickel diarsenide.

Example 14.—Silicon phosphide-arsenide ($y$=1.8 and $z$=0.2)

A pellet weighing 0.370 g. made from a mixture of 0.7492 g. of arsenic, 0.2808 g. of silicon, and 0.3097 g. of phosphorus was heated at a temperature of 1200° C. and at a pressure of 65 kb. for 2 hr. It was then cooled to 1100° C. for 2 hr. and quenched. The product contained black, shiny, single crystalline regions on the ends of the pellet and a black-gray region in the center. The X-ray powder diffraction pattern (Table 5) of the end regions showed the presence of pyrite-type silicon diarsenide-phosphide having a unit cell with $a$=5.736 A.

ABLE 5.—X-RAY DIFFRACTION PATTERN OF SILICON DIARSENIDE-PHOSPHIDE

| Intensity | Spacing A | hkl |
|---|---|---|
| 86 | 2.870 | 200 |
| 100 | 2.566 | 210 |
| 100 | 2.343 | 211 |
| 48 | 2.029 | 220 |
| 8 | 1.913 | 221 |
| 86 | 1.730 | 311 |
| 16 | 1.656 | 222 |
| 60 | 1.592 | 230 |
| 60 | 1.533 | 321 |
| 12 | 1.434 | 400 |
| 8 | 1.392 | 410 |
| 6 | 1.283 | 420 |
| 24 | 1.252 | 421 |
| 15 | 1.223 | 332 |
| 11 | 1.171 | 422 |
| 40 | 1.104 | 511,333 |
| 28 | 1.065 | 250,234 |
| 16 | 1.047 | 521 |
| 26 | 1.014 | 440 |
| 11 | .956 | 600,442 |
| 6 | .943 | 610 |
| 25 | .930 | 611,235 |
| 10 | .896 | 621,450,443 |
| 12 | .875 | 533 |
| 6 | .865 | 622 |
| 14 | .855 | 630,245 |
| 14 | .846 | 631 |
| 8 | .819 | 632 |
| 8 | .803 | 711,551 |
| 14 | .788 | 270 |
| 14 | .781 | 271,633,255 |

The composition of end-regions was shown to be $SiP_{1.8}As_{0.2}$ by application of Vegard's law (L. Vegard, Z. Phys. 5, 17 [1921]; Z. Krist., 67, 239 [1928]).

Four-probe resistivity measurements on a single crystalline specimen showed metallic behavior:

$$\rho_{4.2^\circ\ K.}=1.2\times10^{-4}\ \text{ohm-cm.}$$
$$\rho_{25^\circ\ C.}=3\times10^{-4}\ \text{ohm-cm.}$$

The X-ray powder diffraction pattern of the central region of the pellet showed a pyrite-type powder pattern having broad lines. The unit cell constants calculated therefrom ranged from $a$=5.78 A. to $a$=5.96 A. The corresponding compositions determined by use of Vegard's law range from $SiP_{1.5}As_{0.5}$ to $SiP_{0.4}As_{1.6}$. This range of composition resulted from the large temperature gradient (estimated as 200° C. from the end to the center) present in the tetrahedral anvil high pressure apparatus used in this experiment.

Example 15.—Silicon phosphide-arsenide ($y$=1.8 and $z$=0.2)

A pellet weighing 0.4075 g. made from 0.1404 g. of silicon 0.500 g. of arsenic, and 0.210 g. of phosphorus, was heated at a temperature of 1100° C. and at a pressure of 30 kb., cooled at a temperature of 900° C. for 2 hr., and quenched. The X-ray diffraction pattern of the product showed the presence of pyrite-type silicon diarsenide-phosphide similar in cell size to the $SiP_{1.8}As_{0.2}$ of Example 14.

Example 16.—Silicon-nickel diphospide ($X$=0.5)

A mixture of 0.2935 g. of nickel, 0.1404 g. of silicon, and 0.6350 g. of phosphorus was sealed in heavy walled (2 mm.) Pyrex® tubing and heated at a temperature of 1000° C. and at a pressure of 3 kb. for 4 hr. It was then cooled to a temperature of 900° C. for 2 hr. and quenched. The product was black and shiny and contained some red P.

The product gave a pyrite-type powder pattern (Table 6), indicating a unit cell dimension of $a$=5.58 A. The peaks were somewhat broad, but not enough to indicate a wide range of stoichiometry.

TABLE 6.—X-RAY DIFFRACTION PATTERN OF NICKEL-SILICON DIPHOSPHIDE

| Intensity | Spacing A | hkl |
|---|---|---|
| 40 | 3.222 | 111 |
| 100 | 2.792 | 200 |
| 80 | 2.498 | 210 |
| 65 | 2.281 | 211 |
| 20 | 1.972 | 220 |
| 30 | 1.683 | 311 |
| 8 | 1.549 | 320 |
| 8 | 1.492 | 321 |

The composition of the product by Vegard's law is $Si_{0.5}Ni_{0.5}P_2$. A four-probe resistivity measurement on a polycrystalline piece showed resistivity at room temperature of $1.3\times10^{-2}$ ohm-cm.

Example 17.—Silicon-nickel diphosphide ($x$=0.12)

A 0.347 g. pellet of silicon, nickel, and phosphorus mixed in the mole ratio of 1:1:5 was heated at a temperature of 1200° C. and at a pressure of 65 kb. for 2 hr., cooled for 2 hr. to 1100° C., then quenched. The product was composed of black shiny crystalline regions on the ends, and a black-gray region in the center. The end regions gave an X-ray powder diffraction pattern which was indexed on the basis of a pyrite-type unit cell $a$=5.675 A. By Vegard's law, this corresponds to a composition $Si_{0.88}Ni_{0.12}P_2$. A four-probe resistivity measurement made on a single crystal specimen showed a resistivity at room temperature of $3\times10^{-2}$ ohm-cm.

The central region of the pellet gave a pyrite-type X-ray powder diffraction pattern having broad lines, indicating unit cell dimensions ranging from $a$=5.50 A. to 5.57 A. The corresponding compositions, according to Vegard's law, range from $Si_{0.45}Ni_{0.55}P_2$ to $Si_{0.15}Ni_{0.85}P_2$.

Example 18.—Silicon-nickel diarsenide ($x$=0.65)

A 0.5636 g. pellet made from a mixture of 0.1467 g. of nickel, 0.702 g. of silicon, and 1.1238 g. of arsenic was heated at a temperature of 1300° C. and at a pressure of 65 kb. for 1 hr., cooled for 4 hr. to a temperature of 1100° C., and quenched. The product was a gray-black solid which gave a pyrite-type powder diffraction pattern as shown in Table 7 (after deletion of weak lines due to impurities). This pattern indicated a cubic unit cell with $a$=5.868 A. The corresponding composition by Vegard's law is $Si_{0.35}Ni_{0.65}As_2$.

TABLE 7.—X-RAY DIFFRACTION PATTERN OF $Si_{0.35}Ni_{0.65}As_2$

| Intensity | Spacing A | hkl |
|---|---|---|
| 10 | 3.398 | 111 |
| 64 | 2.934 | 200 |
| 100 | 2.640 | 210 |
| 100 | 2.395 | 211 |
| 20 | 2.073 | 220 |
| 10 | 1.955 | 221 |
| 100 | 1.768 | 311 |
| 10 | 1.693 | 222 |
| 75 | 1.267 | 230 |
| 85 | 1.568 | 123 |
| 25 | 1.466 | 400 |
| 10 | 1.312 | 420 |
| 40 | 1.280 | 421 |
| 25 | 1.250 | 332 |
| 5 | 1.196 | 422 |
| 30 | 1.129 | 511,333 |
| 25 | 1.089 | 250 |
| 20 | 1.071 | 521 |
| 20 | 1.037 | 440 |
| 5 | .978 | 600,442 |
| 5 | .964 | 610 |
| 10 | .952 | 611,532 |
| 5 | .894 | 533 |
| 5 | .875 | 630,542 |
| 5 | .865 | 631 |

Example 19.—Silicon-nickel diarsenide
($x$=0.65)

A pellet weighing 0.5785 g. made from a mixture of 0.1467 g. of nickel, 0.0702 g. of silicon, and 1.033 g. of arsenic was heated at a temperature of 1100° C. and at a pressure of 30 kb. for 1 hr., cooled for 2 hr. to a temperature of 900° C. and quenched. The diffraction pattern of the nickel-silicon diarsenide formed was similar to that of Example 18.

Example 20.—Nickel phosphide-arsenide
($y$≅1.2 and $z$≅0.8)

A 0.5818 g. pellet made from a mixture of 0.4188 g. of nickel, 3.3593 g. of phosphorus, and 0.8430 g. of arsenic was heated at a temperature of 1400° C. and at a pressure of 65 kb. for 1 hr., cooled for 3 hr. to a temperature of 1100° C., and quenched. The product was a gray-black solid. It gave a pyrite-type powder diffraction pattern which was indexed on the basis of a cubic unit cell with $a$=5.59 A. The lines were broad, indicating a range of composition. The average composition by Vegard's law is $NiP_{1.2}As_{0.8}$.

Example 21.—Nickel phosphide-arsenide
($y$=1.33 and $z$=0.67)
($y$=0.96 and $z$=1.04)

A pellet weighing 0.5434 g. was made from a mixture of 0.2935 g. of nickel, 0.5 g. of phosphorus, and 0.21 g. of arsenic. It was heated at a temperature of 1100° C. and at a pressure of 30 kb. for 1 hr. then cooled for 2 hr. to 900° C. and quenched. The diffraction pattern of the product showed the presence of two pyrite-type patterns of unit cell sizes corresponding to compositions $NiP_{1.33}As_{0.67}$ and $NiP_{0.96}As_{1.04}$ as determined by application of Vegard's law.

Example 22.—Silicon-nickel phosphide-arsenide

A 0.499 g. pellet made from a mixture of 0.2635 g. of nickel 0.1404 g. of silicon, 0.3600 g. of phosphorus, and 0.8800 g. of arsenic was heated at a temperature of 1200° C. and at a pressure of 65 kb. for 1 hr. It was cooled for 3 hr. to a temperature of 900° C. and quenched. The product contained black shiny crystals on the ends of the pellet and a black-gray solid in the center. The end regions showed a pyrite-type X-ray powder diffraction pattern (Table 8) corresponding to a unit cell size of $a$=5.705 A.

TABLE 8.—X-RAY DIFFRACTION PATTERN OF NICKEL-SILICON ARSENIDE-PHOSPHIDE

| Intensity | Spacing A | hkl |
|---|---|---|
| 100 | 2.851 | 200 |
| 100 | 2.550 | 210 |
| 90 | 2.328 | 211 |
| 60 | 2.015 | 220 |
| 10 | 1.914 | 221 |
| 100 | 1.719 | 311 |
| 30 | 1.646 | 222 |
| 75 | 1.581 | 230 |
| 85 | 1.523 | 321 |
| 5 | 1.385 | 410,322 |
| 5 | 1.344 | 411 |
| 5 | 1.308 | 331 |
| 5 | 1.276 | 420 |
| 35 | 1.244 | 421 |
| 20 | 1.216 | 332 |
| 10 | 1.164 | 422 |
| 50 | 1.098 | 511,333 |
| 35 | 1.059 | 250,432 |
| 20 | 1.041 | 521 |
| 30 | 1.008 | 440 |
| 10 | .951 | 442,600 |
| 30 | .925 | 611,532 |
| 20 | .870 | 533 |
| 20 | .850 | 630,542 |
| 20 | .841 | 631 |
| 20 | .791 | 640 |
| 20 | .784 | 270,641 |
| 20 | .777 | 721,633,552 |

A portion of the crystals were separated, washed in an ultrasonic water bath, and analyzed by emission spectroscopy. The results confirm that the crystals are a quaternary composition: Found: Ni, 2–10%; Si, 10–50%; P, 10–50%; As, 10–50%.

The central region of the pellet gave an X-ray diffraction pattern similar to that of the end regions, but with lines of other phases present.

Example 23.—Silicon-nickel phosphide-arsenide

A pellet weighing 0.453 g. was made from a mixture of 0.1465 g. of nickel, 0.2106 g. of silicon, 0.3600 g. of phosphorus, and 0.8800 g. of arsenic. It was reacted at a temperature of 1200° C. and at a pressure of 65 kb. for 1 hr., slow cooled to a temperature of 900° C. for 3 hr., then quenched. The product resembled that of Example 22. The end regions gave a pyrite-type powder diffraction pattern of unit cell $a$=5.726 A. Crystals from the end region were cleaned in an ultrasonic water bath, and analyzed by emission spectroscopy. The results indicate a quaternary phase Ni. 1–5%; Si, 10–50%; P, 10–50%; and As, 10–50%.

Example 24.—Silicon diphosphide

A mixture of 0.1405 g. of silicon and 0.330 g. of phosphorus were ground together, placed in a heavy-walled quartz tube and about two or three drops of $Br_2$ were added. The tube was cooled, evacuated and sealed. The tube was heated in a temperature gradient with hot zone at 1120° C., and the cool zone at 600° C. In the cool zone, after three days, a crystalline layer of $SiP_2$ was deposited. The material was identified by its X-ray powder diffraction pattern to be pyrite-type silicon diphosphide. Chemical analysis for P was in good agreement with the formula $SiP_2$. Found: 68.1% P; calculated 68.9% P.

Example 25.—Silicon diphosphide

A mixture of 0.2810 g. of silicon and 0.660 g. of phosphorus were ground together and placed in a quartz tube. The tube was evacuated, one atm. of $Cl_2$ was introduced into the tube and the tube was sealed. It was heated in a temperature gradient with the hot zone at 1150° C. and the cool zone at 500° C. A black crystalline film was deposited near the cool end of the tube. The X-ray diffraction pattern showed the pyrite-type pattern of $SiP_2$.

Four-probe resistivity measurements made on a single crystal specimen showed metallic behavior:

$$\rho_{25^\circ C.}=5\times10^{-5}\text{ ohm-cm.}, \rho_{55^\circ K.}=2\times10^{-6}\text{ ohm-cm.}$$

The compounds of this invention are useful as components of electrical conductors. Silicon diphosphide and silicon diarsenide both have metallic conductivity, as shown by resistivity measurements, viz.:

$NiAs_2$—$\rho_{25^\circ C.}=3.02\times10^{-4}$ ohm-cm. (Example 11);

$SiP_2$—$\rho_{4.2^\circ K.}=1.7\times10^{-5}$ ohm-cm.

and $\rho_{25^\circ C.}=7\times10^{-5}$ ohm-cm. (Example 6);

and $SiAs_2$—$\rho_{4.2^\circ K.}=2.8\times10^{-5}$ ohm-cm.; $\rho_{25^\circ C.}=1.4\times10^{-4}$ ohm-cm.

This high conductivity makes these products useful in paints for producing conducting leads, and junctions for conducting electricity with other materials, e.g., to join a metallic conductor to a transistor such as silicon. The Seebeck coefficient of $SiP_2$ (+26.5 $\mu$V./° C.) indicates that $SiP_2$ is useful as a thermoelectric element.

Example A

An electrical device was constructed with samples of the products prepared in Examples 6, 7, 13 and 17 (i.e., $SiP_2$, $SiAs_2$, $NiAs_2$, and $Si_{0.88}Ni_{0.12}P_2$) separately employed as conducting elements completing a circuit between a battery and a bulb. When the samples were present, and the circuits were closed, electricity was conducted to the bulb and it lit up. Thus the compounds of this invention acted as conductors and as switch contact points.

The resistivity of nickel diphosphide, measured on a single crystal specimen, is metallic and nearly independent of temperature: $\rho_{4.2^\circ K.}=1.69\times10^{-3}$ ohm-cm.;

$\rho_{25^\circ C.}=1.64\times10^{-3}$ ohm-cm.

This feature is useful in conducting paints or in devices requiring a resistivity independent of temperature. The Seebeck coefficient (−44.2 $\mu$v./° C.) of nickel diphosphide indicates its utility as a thermoelectric element.

High conductivity is also shown by the ternary and quaternary compounds of this invention, as $SiP_{1.8}As_{0.2}$: $\rho_{3.2^\circ K.}=1\times10^{-4}$ ohm-cm.; $\rho_{25^\circ C.}=3\times10^{-4}$ ohm-cm. Such compounds possess the same type of utility as the binary compounds with the feature of variability obtained by changes in the composition.

The resistivity of $Si_{0.5}Ni_{0.5}P_2$ ($\rho_{25^\circ C.}=3.5\times10^{-2}$ ohm-cm.) is also nearly independent of temperature. The resistively of $Si_{0.88}Ni_{0.12}P_2$ is: $\rho_{4.2^\circ K.}=5\times10^{-2}$ ohm-cm.; $\rho_{25^\circ C.}=3\times10^{-2}$ ohm-cm.

The foregoing detailed description has been given for clarity of understanding only and no unnecessary limitations are to be understood therefrom. The invention is not limited to the exact details shown and described, for obvious modifications will be apparent to those skilled in the art.

The embodiments of the invention in which an exclusive property or privilege is claimed are defined as follows:

1. A compound of the formula $$Si_{1-x}Ni_xP_yAs_z$$

wherein $x$ is 0–1.0, $y$ and $z$ are 0–2.15 and the sum of $y$ and $z$ is 1.85–2.15, said compound having the pyrite-type crystal structure.

2. A compound of claim 1 of the formula $$SiP_{1.95-2.05}$$

3. A compound of claim 1 of the formula $$SiAs_{1.85-2.15}$$

4. A compound of claim 1 of the formula $$NiP_{1.85-2.15}$$

5. A compound of claim 1 of the formula $$NiAs_{1.85-2.15}$$

6. A compound of claim 1 of the formula $$SiP_yAs_z$$

wherein $y$ and $z$ are as defined in claim 1.

7. A compound of claim 1 of the formula $$NiP_yAs_z$$

wherein $y$ and $z$ are as defined in claim 1.

8. A compound of claim 1 of the formula $$Si_{1-x}Ni_xP_y$$

wherein $x$ and $y$ are as defined in claim 1.

9. A compound of claim 1 of the formula $$Si_{1-x}Ni_xAs_z$$

wherein $x$ and $z$ are as defined in claim 1.

10. A process for preparing a compound of formula $$Si_{1-x}Ni_xP_yAs_z$$

wherein $x$ is 0–1.0, $y$ and $z$ are 0–2.15 and the sum of $y$ and $z$ is 1.85–2.15, said compound having the pyrite-type crystal structure comprising subjecting (a) a mixture selected from the group consisting of elemental arsenic, elemental nickel, elemental phosphorus, elemental silicon, (b) binary compositions selected from the group consisting of nickel arsenide, nickel phosphide, silicon arsenide and silicon phosphide and (c) ternary compositions composed of elements selected from the group consisting of arsensic, nickel, phosphorus and silicon to pressures from 3 kilobars up to 70 kilobars at temperatures of 700–1300° C. and thereafter recovering said compound.

11. A process for preparing a compound of the formula $$Si_{1-x}Ni_xP_yAs_z$$

wherein $x$ is 0–1.0, $y$ and $z$ are 0.2.15 and the sum of $y$ and $z$ is 1.85–2.15, said compound having the pyrite-type crystal structure, comprising subjecting (a) a mixture selected from the group consisting of elemental arsenic, elemental nickel, elemental phosphorus, elemental silicon, (b) binary compositions selected from the group consisting of nickel arsenide, nickel phosphide, silicon arsenide and silicon phosphide and (c) ternary compositions composed of elements selected from the group consisting of arsenic, nickel, phosphorus and silicon wherein the mixture contains a halogen selected from chlorine, bromine or iodine and the process is conducted at temperatures above 700° C. at pressures of 0.005 to 30 kilobars.

References Cited

UNITED STATES PATENTS 3,008,797 11/1961 Bither ---------------- 23—315

OTHER REFERENCES

Chemical Abstracts: vol. 62 (1965), p. 12, 528(*e*), X-Ray Investigation of the Ni-P System and the Crystal Structure of NiP and $NiP_2$ by Egon Larsson (Univ. Uppsala, Swed.), Arkiv Kemi 23(32), 335–65 (1965) (Eng.).

OSCAR R. VERTIZ, *Primary Examiner.*

H. S. MILLER, *Assistant Examiner.*